United States Patent [19]

Richardson

[11] Patent Number: 5,343,722

[45] Date of Patent: Sep. 6, 1994

[54] SPARE TIRE LOCKING DEVICE

[76] Inventor: Ernest W. Richardson, 4250 Easton Rd., Owosso, Mich. 48867

[21] Appl. No.: 95,283

[22] Filed: Jul. 21, 1993

[51] Int. Cl.$^5$ .............................. E05B 65/12
[52] U.S. Cl. .......................... 70/259; 70/14; 224/42.21
[58] Field of Search ............ 70/259, 260, 14, 23, 70/182, 183, 232; 414/463; 224/42.06, 42.12, 42.21, 42.23, 42.25, 42.41

[56] References Cited

U.S. PATENT DOCUMENTS

| | | | |
|---|---|---|---|
| 2,677,261 | 5/1954 | Jacobi | 70/14 |
| 3,431,756 | 3/1969 | Fennell | 70/259 |
| 3,700,130 | 10/1972 | Holdread | 214/454 |
| 3,800,574 | 4/1974 | Reid et al. | 70/231 |
| 3,820,283 | 6/1974 | Acerra et al. | 70/14 X |
| 3,865,264 | 2/1975 | Kuhns | 214/451 |
| 3,918,599 | 11/1975 | Porter | 70/259 X |
| 3,940,959 | 3/1976 | Anderson | 70/259 |
| 4,262,830 | 4/1981 | Haves | 224/42.06 |
| 4,526,021 | 7/1985 | Princell | 70/259 X |
| 4,676,415 | 6/1987 | Kennedy | 224/42.06 |
| 4,765,164 | 8/1988 | Prince | 70/259 |
| 4,848,113 | 7/1989 | Parks | 70/259 |
| 4,988,023 | 1/1991 | Heathcoat | 70/259 X |
| 5,077,995 | 1/1992 | Appelbaum | 70/259 |
| 5,102,022 | 4/1992 | Knezovich | 70/259 X |
| 5,197,641 | 3/1993 | Montgomery, Jr. | 224/42.21 |
| 5,199,287 | 4/1993 | McClary | 70/259 |
| 5,211,043 | 5/1993 | Langdon | 70/259 |

OTHER PUBLICATIONS

Exhibit A1-A5 Locking Device, Inventor and Date Unknown.
Exhibit B1-B3 Locking Device, Inventor and Date Unknown.
Exhibit C1-C2 Locking Device, Inventor and Date Unknown.
Exhibit D1 Locking Device, Applicant was Joint Inventor with Another Person.

Primary Examiner—Peter M. Cuomo
Assistant Examiner—Suzanne L. Dino
Attorney, Agent, or Firm—Daniel L. Girdwood

[57] ABSTRACT

A locking device is provided for a vehicle having a spare tire hoist system for storage of the spare tire. The locking device includes a tubular member having a first end adapted to mateably engage an actuator tube on the hoist, and a second end. The second end includes a press-fit pin or extendable pin that engages the bumper to prevent the tubular member from being removed, and further includes a lock that prevents the tubular member from being rotated without removing the lock. The second end also includes a partially flattened section that can be engaged by a wedge-shaped end of a vehicle lug wrench.

10 Claims, 4 Drawing Sheets

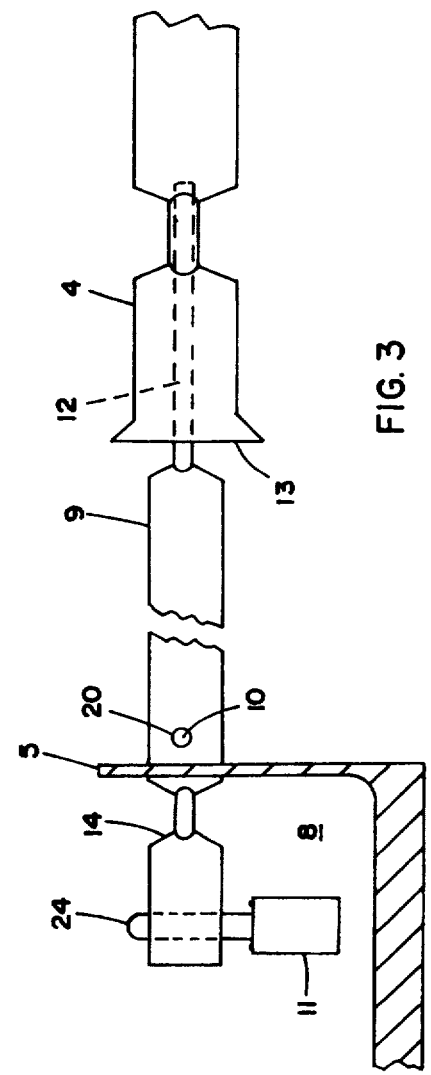
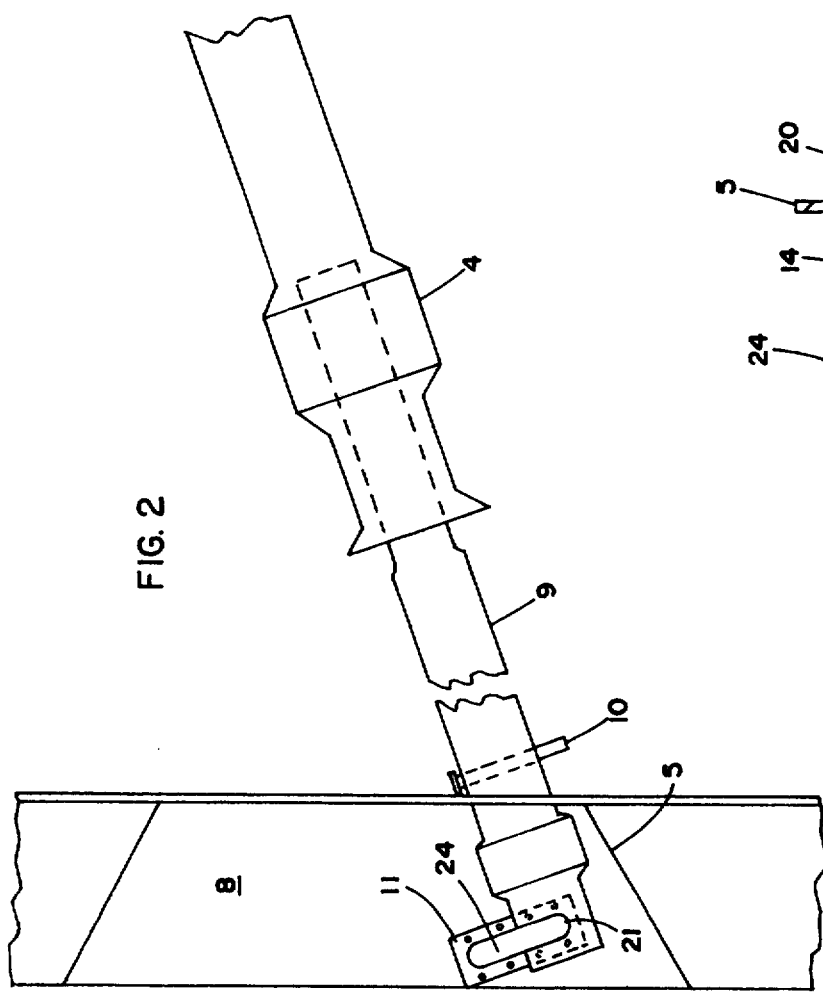

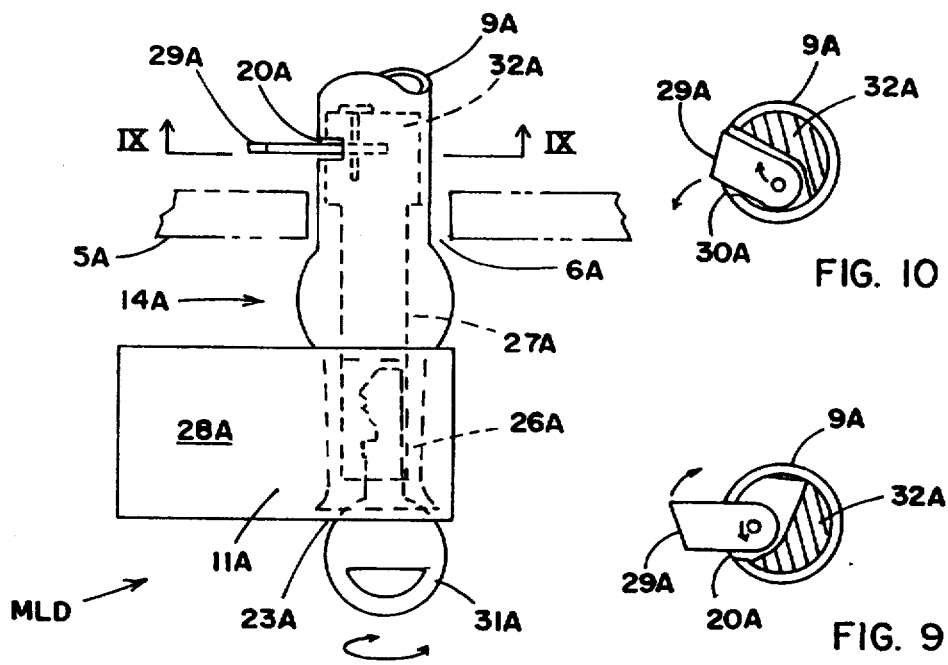
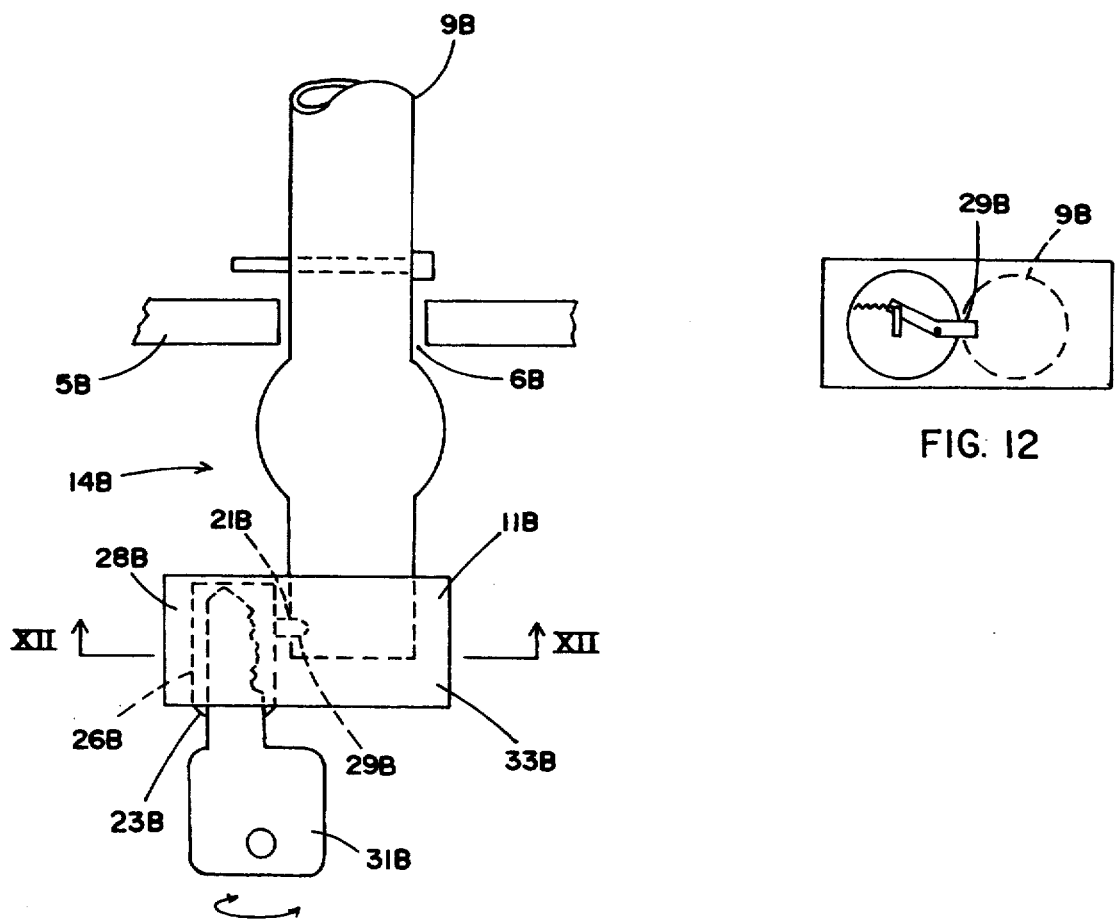

SPARE TIRE LOCKING DEVICE

BACKGROUND OF INVENTION

This invention relates generally to securing spare tires to vehicles and more specifically to an anti-theft device for hoist mounted spare tires mounted to the underside of a vehicle.

Pick-up trucks and other vehicles are often equipped with a spare tire hoist mechanism for storing the spare tire against the undercarriage of the vehicle near the rear portion of the vehicle. The hoist mechanism includes basically a bracket, a cable, a winch, and a winch-actuating tube. The spare tire is supported by the bracket with one end of the cable fastened to the bracket and the other end of the cable attached to the winch. The bracket embraces the spare tire through the center hole of the rim. The tube is used to turn the winch, which winds up the cable thus lifting the spare tire up to the undercarriage of the vehicle. Reversing this process allows the spare tire to be lowered so that it can be removed for use.

To access the tube, there is a hole in the rear bumper of the vehicle. By inserting a lug wrench or similar type wrench through the hole in the bumper and into the tube, an operator can raise and lower the spare tire from a position behind the vehicle. Lug wrenches are typically provided with vehicles, the lug wrenches including a flattened end for engaging the end of the tube and also including a laterally extending portion acting as a handle to provide leverage for rotating the tube.

Thefts of spare tires from vehicles using the above described spare tire storage mechanism are very common since the hoist can be easily lowered and the spare tire removed all within a relatively short time interval. To deter such thefts, a number of different locking devices have been developed. These devices usually prevent access to the tube or prevent the tube from being rotated. However known locking devices are cumbersome to install and/or use, and typically require that the operator access them from under the vehicle before the spare tire can be removed. This is undesirable since this area of the vehicle tends to be very messy from the mud, dirt, and other debris that inherently collect on the vehicle rear underbody surfaces. Further, the environment under the vehicle in the rear is particularly corrosive and prone to accelerate rust, corrosion, and other chemical damage such that many known locking systems, particularly those with parts that must move relative to each other, have a relatively short service life. Still further, some known locking systems simply are too complex and/or include additional pieces that must be manipulated in order to use the locking system. Also, the additional pieces add to the overall cost of the locking system.

Thus, a locking device solving the aforementioned problems is desired.

SUMMARY OF INVENTION

One aspect of the present invention is a locking device for a vehicle having a hoist system for storing a spare tire, and an access hole for accessing a hoist actuator tube on the hoist system. The locking device includes a tubular member having a first end adapted to engage the hoist actuator tube and further having a configured end. The length of the tubular member is such that the configured end extends through the vehicle access port when the first end of the tubular member is positioned in the hoist tube. The locking device further includes retaining means for retaining the tubular member on the inside of the bumper to prevent removal of the first end from the hoist tube. A lock is engageable with the configured end, the lock including a body that engages the bumper to prevent rotation of the tubular member, thereby preventing rotation of the hoist tube and in turn preventing theft of the spare tire.

Another aspect of the present invention is a lockable hoist for a vehicle having a spare tire, the hoist being adapted to retain the spare tire in a storage position. The vehicle includes an access port, and the hoist includes an actuator having a tubular member with a configured end that extends through the access port. Locking means is provided that is accessible from a position outside the component for locking the elongated member to prevent theft of the spare tire, the locking means including means abuttingly engaging the vehicle component to prevent unauthorized rotation of the elongated member. The tubular member is provided with a configured end that is configured to mateably receivingly engage a lug wrench having a wedgeshaped end, whereby the hoist actuator can be unlocked, engaged by a lug wrench, rotated by the lug wrench, and thus the spare tire can be accessed.

An object of the present invention is to provide a simplified and low cost locking device that can be used in conjunction with vehicles of the type wherein the spare tire is stored by a hoist mechanism secured to the undercarriage of the vehicle, which locking device is effective to deter theft but is easily installable, useable, and has a long service life.

Another object of the present invention is to provide a locking device that can be used in conjunction with vehicles having a spare tire hoist mechanism, which locking device restricts access by a thief to the spare tire by preventing a thief from rotating the tube of the hoist mechanism to lower the spare tire, but which locking device positions the lock in an easily accessible place and thus does not require the vehicle operator to crawl under the vehicle to release the locking device.

A further object of the present invention is to provide a locking device that uses the vehicle bumper to partially shield the lock of the locking device, which shielding aids in preventing a thief from physically damaging the lock and further aids in protecting the lock from the corrosive environment under the vehicle.

A still further object of this invention is to provide a locking device which needs no special tools or additional parts which the owner must carry with the vehicle to access the spare tire other than the lug wrench which is provided with the vehicle.

These and other objects, advantages, and features of the present invention will become apparent to those persons skilled in the art upon review of the specification, claims, and appended drawings.

BRIEF DESCRIPTION OF THE DRAWINGS

FIG. 2 is an enlarged fragmentary plan view of the spare tire hoist mechanism tube with the locking device inserted into the hoist mechanism tube and through the vehicle bumper.

FIG. 3 is an enlarged fragmentary elevational view of the spare tire hoist mechanism tube with locking device inserted in the hoist mechanism tube and through the vehicle bumper.

FIG. 8 is an enlarged fragmentary plan view of the spare tire hoist mechanism tube with a modified locking device inserted therein.

FIG. 9 is a cross sectional view taken along the lines IX—IX.

FIG. 10 is a cross sectional view comparable to FIG. 9 but with the locking pin retracted.

FIG. 11 is a plan view of the third embodiment of the locking device.

FIG. 12 is a cross sectional view taken along the lines XII— XII in FIG. 11.

The locking device being modified to include a spring clip which grips the locking device elongated member to hold the locking device in the bumper.

DESCRIPTION OF THE PREFERRED EMBODIMENT

Figure 1:
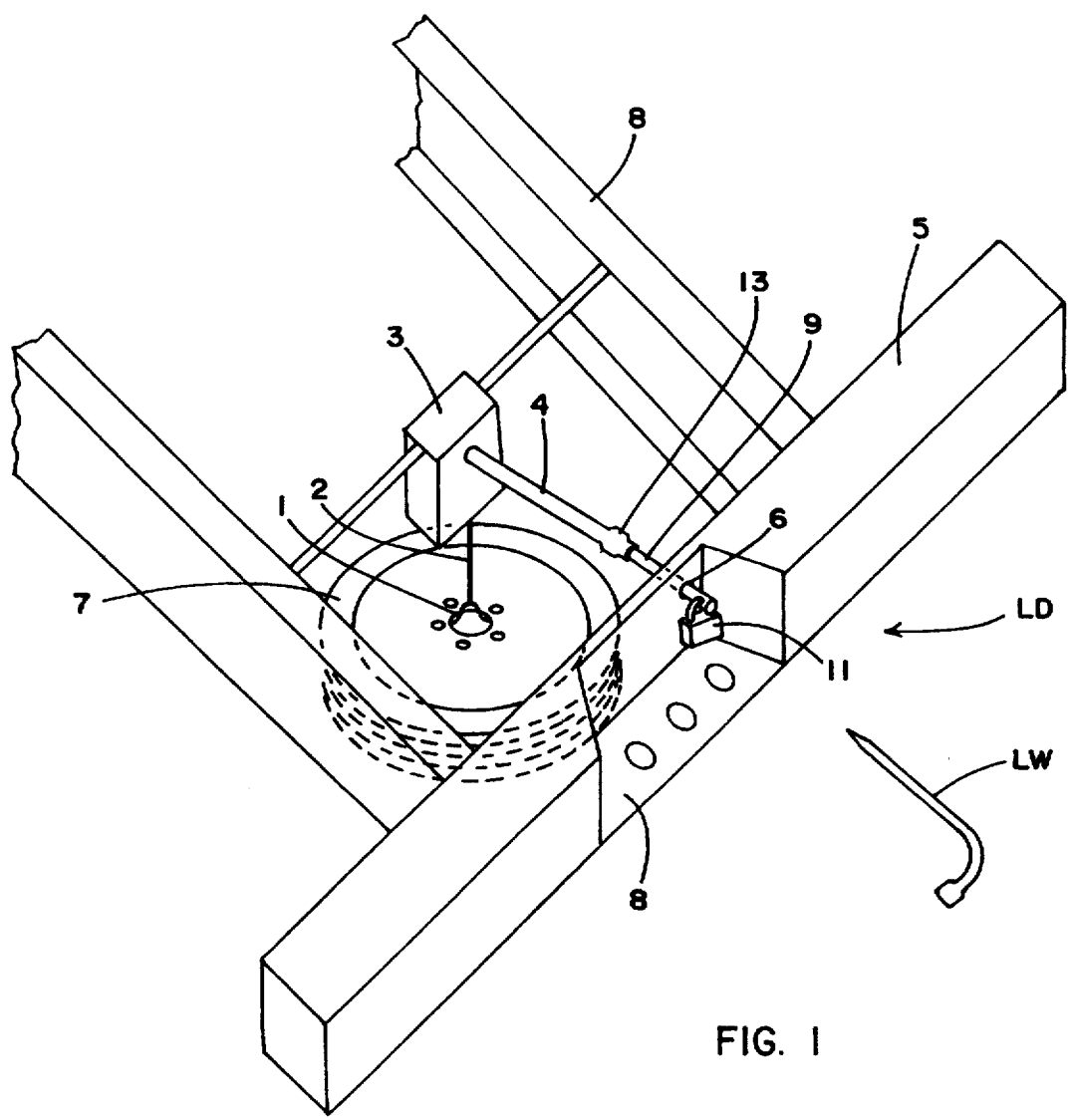
FIG. 1 is a perspective view of the rear of a pick-up truck undercarriage, the truck body having been removed, showing a spare tire stored against the undercarriage of the truck and showing a locking device embodying the present invention installed thereon.
Figure 4:
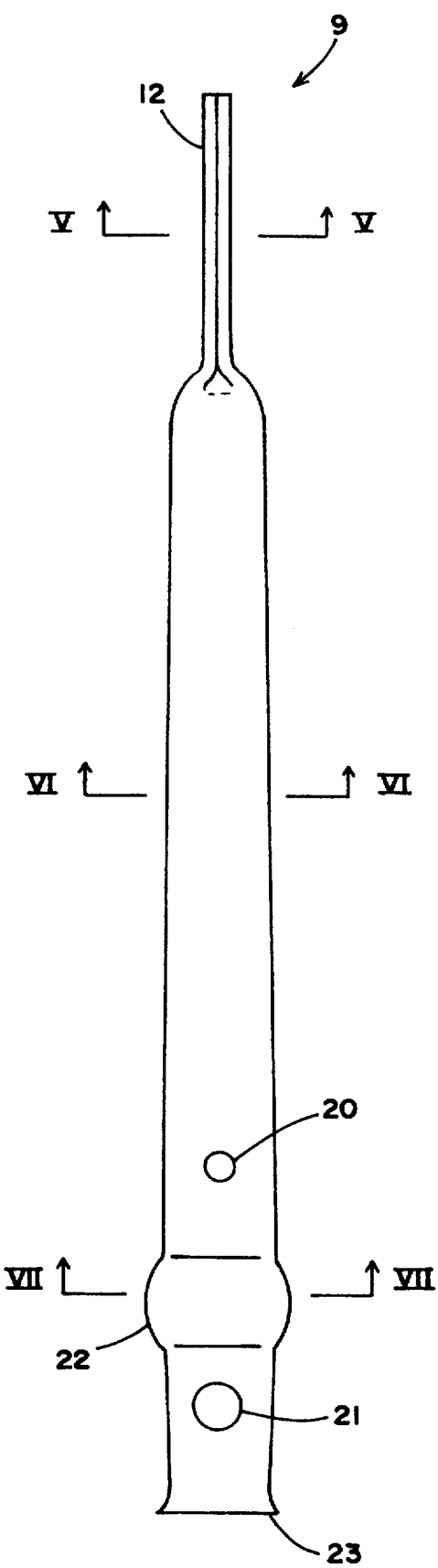
FIG. 4 is a plan view of the tubular member of the locking device.

Referring to the drawings, there is shown in FIG. 1 the rear portion of the pick-up frame with a spare tire 7 stored against the undercarriage of the truck. The spare tire 7 is supported by a hoist mechanism which is comprised of a bracket 1, a cable 2, a winch 3, and a tube 4. Bracket 1 engages the spare tire 7 through the center hole of the rim. The winch 3 raises and lowers the bracket 1 by means of a cable 2. The hoist tube 4 is attached to the winch 3 and includes a free end 13 that is partially flattened such that it can be easily accessed through a hole or access port 6 in bumper 5 and rotated to operate the winch. Hole 6 is located in bumper 5 in the rear wall of a license plate pocket 8 formed in the center of bumper 5, but it is contemplated that the hole could be located any where in the vehicle bumper or the vehicle body.

As provided by the original vehicle manufacturer, spare tires stored in this fashion are readily accessible by inserting a wrench "LW" or similar type wrench through the hole 6 in bumper 5 such that a wedge-shaped end of the lug wrench engages the free end 13 of hoist tube 4. Tube 4 can then be rotated such that the winch 3 will lower spare tire 7. However, this arrangement also allows unauthorized access to the spare tire.

Figure 5:
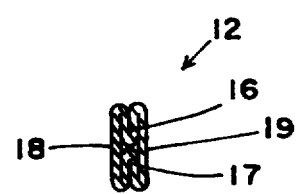
FIGS. 5–7 are cross sectional views taken along the lines V—V, VI—VI, and VII—VII, respectively, in FIG. 4.
Figure 6:
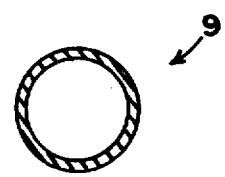
Figure 7:
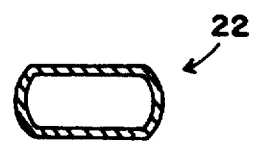

Shown in FIGS. 1, 2, and 3 is a locking device "50" embodying the present invention that can be retrofittably attached to a truck. Locking device "50" is comprised of a tubular member 9, a retaining pin 10 (FIG. 2), and a padlock 11. Tube member 9 includes a flattened end 12 (FIG. 3) configured to mateably engage the flattened portion on free end 13 of hoist tube 4. Tubular member 9 (FIGS. 4–7) is a steel tube made of about one millimeter wall thickness, although it is contemplated that a variety of different materials and wall thicknesses could be used. Flattened end 12 (FIG. 5) is formed by deforming opposing sides 16 and 17 of the round tube inwardly so as to form a figure "8" pattern, and then fully collapsing the orthogonally positioned sides 18 and 19 flat against each other to form a rectangular shape having a total thickness of four wall thicknesses. This quadruple wall thickness has ample strength to engage hoist tube free end 13 and rotate spare tire winch 3 even if the winch is poorly lubricated.

Tubular member 9 further includes a configured end 14 opposite flattened end 12. Configured end 14 (FIG. 4) includes a pair of spaced apart holes 20 and 21, with a partially flattened section 22 therebetween. The extreme end 23 of configured end 14 can be flared outwardly if desired to facilitate easy insertion of a spare tire tool therein. The wedge shaped end of the vehicle lug wrench LW can be inserted into configured end 14 through extreme end 23 and past outer hole 21 to engage partially flattened section 22 so that tube member 9 can be rotated. Tube member 9 in turn has sufficient strength to rotate hoist tube 4. Notably, inner hole 20 is sized to press-fittingly receive a retaining pin 10 and outer hole 21 is sized to receive the shank of a padlock 11 as discussed below.

The length of tubular member 9 is chosen to position configured end 14 partially through hole 6 in bumper 5 when flattened end 12 is fully positioned in the partially flattened portion 13 of tube 4 (FIG. 2). In this installed position, inner hole 20 is located proximate the inside of bumper 5 and outer hole 21 is located proximate the outside of bumper 5 in license plate pocket 8. Partially flattened portion 22 is located between holes 20 and 21. Retaining pin 10 is press-fittingly insertable through inner hole 20 and extends either side of tubular member 9 such that retaining pin 10 engages bumper 5 and thus prohibits removal of tubular member 9 through bumper hole 6. It is noted that retaining pin 10 can be retained in inner hole 20 in a number of different ways such as by utilization of a headed bolt and nut wherein the head of the bolt is configured so that the bolt can only be engaged to rotate bolt into the nut but cannot be easily engaged to rotate the bolt in the opposite direction out of the nut. It is also contemplated that locking adhesive, locking nuts, and other arrangements can be used. Further, where tubular member 9 is installed before installing bumper 5, such as by the original vehicle manufacturer, the pin can be replaced with a welded bracket or the like with the welded bracket including a laterally extending finger protruding laterally from the tubular member.

As shown in FIG. 2, padlock 11 includes a U-shaped locking arm or shank 24 that can be attached to tubular member 9 with the U-shaped locking arm 24 extending through outer hole 21. As thus positioned, locking arm 24 physically restricts access to the partially flattened portion of tubular member 9. Further, the body of padlock 11 prohibits rotation of tubular member 9 and hoist tube 4 by wedging against the walls of bumper 5 forming the rear license plate pocket 8.

To install the locking device, the flattened end 12 of tubular member 9 is inserted through hole 6 in bumper 5 and aligned with partially flattened portion 13 of tube 4. The retaining pin 10 is press-fittingly inserted through inner hole 20 of tubular member 9 on the inside of bumper 5 and secured therein. Thus, retaining pin 10 prohibits tubular member 9 from being pulled out of hole 6. Locking arm 24 of padlock 11 is then inserted through hole 21 in tubular member 9 on the outside of bumper 5, padlock 11 thus prohibiting entry to the locking device and also prohibiting rotation as described above. The location of padlock 11 in license plate pocket 8 partially protects padlock 11 so that it is difficult for a thief to damage lock 11, and further bumper 5 shields padlock 11 from much of the debris and corrosive environment under the truck.

To access the spare tire 7, padlock 11 is removed and a lug wrench or similar type wrench is inserted into the partially flattened section 22 of tubular member 9 and rotated. This causes hoist tube 4 to rotate which lowers spare tire 7, thus making spare tire 7 accessible. FIG. 13 shows a perspective view of padlock 11 installed on the configured end 14 of tubular member 9 adjacent bumper 5.

In a second embodiment shown in FIG. 8, is a modified locking device generally referred to by the number "50A", also the modified locking devices shown hereafter, corresponding parts are identified by the identical number but with the addition of the letters "A", "B", "C", and etc. Modifications are described as necessary, but these designations are intended to reduce redundant discussion.

In modified locking device "50A", padlock 11 is replaced with an "up-level" 11A lock having improved aesthetics and utility, and tubular member 9A is modified for receipt of same.

Specifically, modified locking device 50A (FIGS. 8-10) includes a tubular member 9A, tubular member 9A having a flattened end generally comparable to flattened end 12A, and also having a modified configured end 14A. The length of tubular member 9A is chosen to position configured end 14A partially through hole 6A in the vehicle bumper 5A when the flattened end of tubular member 9A is fully seated in the partially flattened portion of the first tube. Configured end 14A includes an aperture or slot 20A located on the inside of bumper 5A. Lock 11A includes a lock tumbler 26A and a protruding portion 27A that extends from lock tumbler 26A into configured end 14A, and further includes an offset portion 28A that is laterally offset from the length of tubular member 11A. Laterally offset portion 28A is enlarged and prevents tubular member 9A from being rotated by abuttingly engaging the license plate pocket on bumper 5A. Lock tumbler 26A is accessible from the exposed end 23A on lock 11A. Protruding portion 27A extends from lock tumbler 26A and operably pivotally engages an extendable tab 29A that is carried on a rotatable bearing 32A. Extendable tab 29A is located inside configured end 14A of tubular member 9A adjacent a slot 20A. Tab 29A is extendable out of slot 20A to a locking position (FIGS. 8-9) by rotating bearing 32A and protruding portion 27A whereat the tab 29A extends laterally from protruding portion 27A through slot 20A in configured end 14A. Tab 29A is also retractable to an unlocked position by rotating bearing 32A and protruding portion 27A in an opposite direction whereat tab 29A is retracted into tubular member 9A (FIG. 10). When locked (FIG. 8), the free end of tab 29A prevents removal of tubular member 9A by engaging the inside of bumper 9A. When unlocked (FIG. 10), tubular member 9A is removable with lock 11A from tube 4A. Preferably, lock 11A is adapted to receive a key 31A comparable to or identical to the vehicle door key or ignition key, thus further facilitating convenience to the operator.

A third embodiment shown in FIGS. 11 and 12, and generally referred to as "50B" includes a tubular member 9B, tubular member 9B having a flattened end generally comparable to flattened end 12, and also having a modified configured end 14B. Configured end 14B includes an aperture or slot 21B located on outside of bumper 5B. Lock 11B includes a tumbler 26B, a tab 29B, a housing 33B, and an offset portion 28B. The housing 33B includes a tube engaging portion 34B and an offset portion 28B large enough to prevent tubular member 9B from being rotated by abuttingly engaging the license plate pocket on bumper 5B. Lock tumbler 26B is accessible from the exposed end 23B on lock 11B. A pin 29B extends through hole 21B in tube 9B, pin 29B being biased by a spring 37B so as to stay in extended position except when tumbler 26B is rotated so as to retract pin 29B from hole 21B. This allows lock 11B to be removed thus permitting access to retrieve spare tire 7. A spring clip 36B is installed on tubular member 9B on the inside of bumper 5B. Spring clip 36B includes teeth 37B that bite into the sides of tubular member 9B to prevent tubular member 9B from being removed through the access port in bumper 5B.

Notably, it is contemplated that hoist tube 4 could be manufactured by the vehicle manufacturer so that hoist tube 4 includes an end that extends through access port 6. In such case, lock 11 could be used and, since the hoist tube itself would extend through the bumper access port, a pin 10 need not be used.

Thus, a locking device is provided which is easily manufactured, installed, and useable, but which is effective in preventing theft and aesthetically pleasing. The locking device includes a tubular member for engaging a hoist tube on a vehicle as manufactured, and further includes a retaining pin and a lock for securely holding the tubular member in engagement with the hoist tube but preventing unauthorized rotation of the hoist tube for accessing the vehicle spare tire.

I claim:

1. A locking device for a vehicle including a hoist system for storing a spare tire, the hoist system including a hoist tube operably connected to the hoist system for lowering the spare tire, the vehicle including a bumper having an access hole therein for accessing the hoist tube, comprising:
    a tubular member including a first end adapted for engagement with the hoist tube and further including a configured end, the length of the tubular member being such that the configured end extends through the access hole when the first end is positioned in the hoist tube;
    retaining means, for retaining the tubular member, on the inside of the bumper to prevent removal of the first end from the hoist tube, said retaining means including a fastener that extends through said tubular member; and
    a lock releasibly engageable with the configured end, said lock including a body that engages the bumper to prevent rotation of said tubular member when the lock is engaged with the configured end, thereby preventing rotation of the hoist tube and in turn preventing theft of the spare tire.

2. A locking device as defined in claim 1 wherein said tubular member includes a hole located proximate said access hole on the inside of said bumper when said first end is engaged with said hoist tube.

3. A locking device as defined in claim 1 wherein said configured end includes a hole positioned outside of said bumper access hole and said lock includes a locking arm adapted to fit through said hole in said configured end.

4. A locking device as defined in claim 3 wherein said lock includes a padlock.

5. A locking device as defined in claim 1 including a key adapted to unlock said lock, said key also being adapted for use as a vehicle ignition key or a vehicle door lock key.

6. A locking device as defined in claim 1 wherein the hoist tube includes a partially flattened engageable part, and said tubular member configured end includes a partially flattened portion that substantially duplicates the engageable part of the hoist tube.

7. A locking device as defined in claim 1 wherein said means for retaining includes a laterally extendable tab, and said lock includes a portion that extends into said configured end and into engagement with said laterally extendable tab, said lock being actuable to extend said tab so that said tab abuttingly engages the inside of said bumper, and being actuable to retract said tab so that said tab and said tubular member can be removed through said bumper access port.

8. A locking device for a vehicle including a hoist system for storing a spare tire, the hoist system including a hoist tube operably connected to the hoist system for lowering the spare tire, the vehicle including a bumper having an access hole therein for accessing the hoist tube, comprising:

a tubular member including a first end adapted for engagement with the hoist tube and further including a configured end, the length of the tubular member being such that the configured end extends through the access hole when the first end is positioned in the hoist tube, said tubular member configured end including an inside hole located on the inside of said bumper, an outside hole located on the outside of said bumper, and a partially flattened portion located between said inside and outside holes when said first end is engaged with said hoist tube;

retaining means, for retaining the tubular member, on the inside of the bumper to prevent removal of the first end from the hoist tube; and a lock releasibly engageable with the configured end, said lock including a body that engages the bumper to prevent rotation of said tubular member when the lock is engaged with the configured end, thereby preventing rotation of the hoist tube and in turn preventing theft of the spare tire.

9. A lockable hoist for a vehicle having a spare tire, comprising:

a hoist for retaining a spare tire in a storage position;

a hoist actuator including a rotatable hoist actuator tube with a protruding end configured to operably receive a wedge-shaped end of an automobile lug wrench;

an extension including a shaped end configured to operably engage said protruding end of said hoist actuator tube, said shaped end effectively replicating the wedge-shaped end of the automobile lug wrench, said extension further including an opposite end including material defining a pair of apertures, one of said apertures being configured to receive a pin for retaining said extension to the vehicle and the other of said apertures being configured to receive a lock to prevent rotation of the hoist actuator tube.

10. A lockable hoist as defined in claim 9 wherein said extension is made from a tube.

* * * * *

UNITED STATES PATENT AND TRADEMARK OFFICE
CERTIFICATE OF CORRECTION

PATENT NO. : 5,343,722
DATED : September 6, 1994
INVENTOR(S) : Ernest W. Richardson It is certified that error appears in the above-indentified patent and that said Letters Patent is hereby corrected as shown below:

Column 3, line 46;
  After "inserting a" insert --lug--.

Column 5, line 63;
  "end 12" should be --end 12B--.

Signed and Sealed this

Sixteenth Day of May, 1995

*Attest:*

BRUCE LEHMAN

*Attesting Officer*   *Commissioner of Patents and Trademarks*